(12) United States Patent
Vanags et al.

(10) Patent No.: US 10,705,804 B2
(45) Date of Patent: Jul. 7, 2020

(54) STRONGLY TYPED METADATA ACCESS IN OBJECT ORIENTED PROGRAMMING LANGUAGES WITH REFLECTION SUPPORT

(71) Applicants: Mikus Vanags, Riga (LV); Arturs Licis, Riga (LV); Janis Justs, Riga (LV)

(72) Inventors: Mikus Vanags, Riga (LV); Arturs Licis, Riga (LV); Janis Justs, Riga (LV)

(73) Assignee: Logistics Research Centre SIA, Riga (LV)

( * ) Notice: Subject to any disclaimer, the term of this patent is extended or adjusted under 35 U.S.C. 154(b) by 872 days.

(21) Appl. No.: 13/773,662

(22) Filed: Feb. 22, 2013

(65) Prior Publication Data

US 2014/0068557 A1 Mar. 6, 2014

Related U.S. Application Data

(60) Provisional application No. 61/603,342, filed on Feb. 26, 2012.

(51) Int. Cl.
*G06F 9/44* (2018.01)
*G06F 8/30* (2018.01)

(52) U.S. Cl.
CPC .................. *G06F 8/315* (2013.01)

(58) Field of Classification Search
CPC ..... G06F 8/30; G06F 8/31; G06F 8/51; G06F 8/61; G06F 9/4411; G06F 9/4428; G06F 9/45516
See application file for complete search history.

(56) References Cited

U.S. PATENT DOCUMENTS

| 7,669,191 B1 * | 2/2010 | Kelly ...................... G06F 8/437 717/140 |
| 7,873,592 B2 * | 1/2011 | Meijer .................. G06F 9/4428 706/52 |

(Continued)

OTHER PUBLICATIONS

Pinaki Poddar, "Dynamic, typesafe queries in JPA 2.0", Sep. 22, 2009, IBM Corporation, pp. 1-23; <http://www.ibm.com/developerworks/library/j-typesafejpa/j-typesafejpa-pdf.pdf>.*

(Continued)

*Primary Examiner* — Bing Zhao

(57) ABSTRACT

Type safety is important property of any type system. Modern programming languages support different mechanisms to work in type safe manner, e.g., properties, methods, events, attributes (annotations) and other structures, but none of the existing, general purpose, programming languages which support reflection provide type safe type (class/structure) member metadata access. Existing solutions provide no or limited type safety which are complex and processed at runtime which by definition is not built-in type-safe metadata access, but only more or less type safe workarounds called "best practices". Problem can be solved by introducing method for type safe type member metadata access which could be processed at compile time.

23 Claims, 13 Drawing Sheets

```
//accessing member when having source object
var somebody = new Person("Anonymous");
MemberInfo<string> memberMetadata = memberof(somebody.FullName);

//accessing field without having source object
FieldInfo<string> fieldMetadata = memberof(Person.FullName);

//accessing property without having source object
PropertyInfo<string> propertyMetadata = memberof(CustomerViewModel.FullName);

//accessing parameter less constructor metadata
ConstructorInfo<Action> constructorMetadata = memberof(CustomerViewModel());

//accessing metadata from constructor with one string parameter
ConstructorInfo<Action<String>> constructorMetadata = memberof(Person(string));

//accessing parameterless method metadata without having source object
MethodInfo<Action> methodMetadata = memberof(Person.DoSomething());

//accessing metadata from method with one parameter of type string
MethodInfo<Action<string>> methodMetadata
    = memberof(Person.DoSomething(string));

/*accessing metadata from method with two parameters: first - string, second - double and
returning value of type - int */
MethodInfo<Func<string, double, int>> methodMetadata
    = memberof(Person.DoSomething(string, double));

//accessing metadata from event
EventInfo<EventArgs> eventMetadata = memberof(Person.SomeEvent);
```

(56) References Cited

U.S. PATENT DOCUMENTS

| | | | | |
|---|---|---|---|---|
| 8,782,117 | B2* | 7/2014 | Nachreiner | G06F 9/547 709/200 |
| 9,361,129 | B2* | 6/2016 | Le Roy | G06F 9/4433 |
| 2005/0071852 | A1* | 3/2005 | Yoon | 719/328 |
| 2006/0143597 | A1* | 6/2006 | Alaluf et al. | 717/136 |
| 2006/0225053 | A1* | 10/2006 | Lakshman | G06F 8/437 717/140 |
| 2006/0236315 | A1* | 10/2006 | Bracha | G06F 8/437 717/168 |
| 2007/0168949 | A1* | 7/2007 | Shattuck et al. | 717/115 |
| 2007/0262996 | A1* | 11/2007 | Fernandez et al. | 345/473 |
| 2008/0040656 | A1* | 2/2008 | Lammel | G06F 8/315 715/230 |
| 2008/0262992 | A1* | 10/2008 | Meijer | G06F 9/4428 706/52 |
| 2008/0282238 | A1* | 11/2008 | Meijer | G06F 8/437 717/162 |
| 2008/0320453 | A1* | 12/2008 | Meijer | G06F 8/423 717/140 |
| 2009/0037895 | A1* | 2/2009 | Le Roy | G06F 9/4433 717/165 |
| 2009/0234804 | A1* | 9/2009 | Whitechapel | G06F 9/443 |
| 2009/0265368 | A1* | 10/2009 | Crider et al. | 707/102 |
| 2010/0162211 | A1* | 6/2010 | Ostrovsky et al. | 717/114 |
| 2010/0242017 | A1* | 9/2010 | Stenberg | G06F 8/30 717/111 |
| 2012/0079465 | A1* | 3/2012 | Harvey | G06F 8/437 717/146 |
| 2012/0324432 | A1* | 12/2012 | Mizrachi et al. | 717/162 |
| 2013/0054669 | A1* | 2/2013 | Nachreiner | G06F 9/547 709/201 |
| 2013/0120824 | A1* | 5/2013 | Ono et al. | 359/284 |
| 2014/0046984 | A1* | 2/2014 | Sollich | 707/803 |
| 2015/0161199 | A1* | 6/2015 | Pinko | H04L 67/306 707/736 |

OTHER PUBLICATIONS

Francois-Nicola Demers, Jacques Malenfant: Reflection in logic, functional and object-oriented programming: a Short Comparative Study. In: Proc. of the IJCAI'95 Workshop on Reflection and Metalevel Architectures and their Applications in AI, pp. 29-38. Montreal (1995).

C# Language Specification Version 5.0. Microsoft Corporation (1999-2012).

Jon Skeet: C# in Depth Second Edition, Manning, Stamford (2011).

Java Language and Virtual Machine Specifications, Oracle Corporation (1997-2014).

Ira R. Forman, Nate Forman: Java Reflection in Action. Manning Publications, (2004).

Josh Smith: WPF Apps With the Model-View-ViewModel Design Pattern. Microsoft Developer Network , Microsoft Corporation (2009).

How to implement MWM (Model-View-ViewModel) in TDD (Test Driven Development). Developer code samples, Microsoft Developer Network , Microsoft Corporation (2011).

Alexandra Rusina: Getting Information About Objects, Types, and Members with Expression Trees. Microsoft Developer Network Blogs, Microsoft Corporation (2010).

Joseph Albahari, Ben Albahari: C# 5.0 in a Nutshell, 5th Edition, The Definitive Reference. O'Reilly Media, (2012).

Eric Lippert: In Foof We Trust: A Dialogue. Microsoft Developer Network Blogs, Microsoft Corporation (2009).

Jeffrey Palermo, Jimmy Bogard, Eric Hexter, Matthew Hinze, Jeremy Skinner: ASP.NET MVC 4 in. Action. Manning, New York (2012).

Brian Vargas. New C# Operator. The Dumping Ground (Life and code) blog (2004).

Alain B-H. Add nameof operator in C#. Visual Studio user voice, Microsoft Corporation (2011).

Caller Information (C# and Visual Basic). Microsoft Developer Network , Microsoft Corporation (2012).

* cited by examiner

FIG. 1 -Prior Art-

```
public class Person
{
    public string FullName;
    public static int TotalPersons;
    public Person(string fullName)
    {
        this.FullName = fullName;
    }
    public void DoSomething() { }
    public void DoSomething(string arg) { }
    public int DoSomething(string arg1, double arg2)
    {
        return 0;
    }
    public event EventHandler<EventArgs> SomeEvent;
}
```

FIG. 2 -Prior Art-

```
Type personType = typeof (Person);

//Accessing instance field metadata:
FieldInfo instanceMemberMetadata = personType.GetField("FullName");
//Accessing static field metadata:
FieldInfo staticMemberMetadata = personType.GetField("TotalPersons");
//Accessing metadata for method with one string parameter:
MethodInfo methodMetadata = personType.GetMethod("DoSomething",
    new Type[] { typeof(string) });
//Accessing metadata for type constructor with one string parameter:
ConstructorInfo constructorMetadata = personType.GetConstructor(
    new Type[] { typeof(string) });
//Accessing metadata for event:
EventInfo eventMetadata = personType.GetEvent("SomeEvent");
```

FIG. 3 -Prior Art-

```
public class Person {
        public String fullName;
        public static int totalPersons;

public Person(String fullName) {
                this.fullName = fullName;
        } public void doSomething() { }
        public void doSomething(String arg) { }
        public int doSomething(String arg1, double arg2) {
                return 0;
        }
}
```

FIG. 4 -Prior Art-

```
Class<Person> personClass = Person.class;
//Accessing instance field metadata:
Field instanceMemberMetadata = personClass.getField("fullName");
//Accessing static field metadata:
Field staticMemberMetadata = personClass.getField("totalPersons");
//Accessing metadata for method with one string parameter:
Method doSomethingArg = personClass.getMethod("doSomething", String.class);
//Accessing metadata for type constructor with one string parameter:
Constructor<Person> constructorMetadata = personClass.getConstructor(String.class);
```

FIG. 5 -Prior Art-

```
//base class is simple class without generic parameter
public class CustomerViewModel: ViewModelBase
{
    private readonly Customer _model;

public CustomerViewModel(Customer model)
    {
        _model = model;
    } public string FullName
    {
        get { return _model.FullName; }
        set
        {
            if (_model.FullName!= value)
            {
                _model.FullName = value;
                //Not type safe, property processed at compile time
                OnPropertyChanged("FullName");
            }
        }
    }
}
```

FIG. 6 -Prior Art-

```
//base class generic parameter specification contains redundant information
//in ideal case this information should be known from context
public class CustomerViewModel : ViewModelBase<CustomerViewModel>
{
    private readonly Customer _model;
    public CustomerViewModel(Customer model)
    {
        _model = model;
    }
    public string FullName
    {
        get { return _model.FullName; }
        set
        {
            if (_model.FullName != value)
            {
                _model.FullName = value;
                //type safe, but confusing syntax and expression
                //tree processing could take significant time
                OnPropertyChanged(x => x.FullName);
            }
        }
    }
}
```

FIG. 7 -Prior Art-

```
public class CustomerViewModel : INotifyPropertyChanged
{
    private readonly Customer _model;

public event PropertyChangedEventHandler PropertyChanged = delegate { };

private void RaisePropertyChanged(
        [CallerMemberName] string propertyName = null)
    {
        Console.WriteLine(propertyName);
        PropertyChanged(this, new PropertyChangedEventArgs(propertyName));
    } public CustomerViewModel(Customer model)
    {
        _model = model;
    } public string FullName
    {
        get { return _model.FullName; }
        set
        {
            if (_model.FullName != value)
            {
                _model.FullName = value;
                //Type safe form, processed at compile time
                RaisePropertyChanged();
                // The compiler converts the above line to:
                // RaisePropertyChanged ("FullName");
            }
        }
    }
}
```

FIG. 8

```
//Pseudocode A
//static member metadata could be accessed only using type
FieldInfo staticMemberMetadata = memberof(Person.TotalPersons);
//instance member metadata could be accessed also using object instance
var myFriend = new Person("Oscar");
FieldInfo instanceMemberMetadata = memberof(myFriend.FullName);

//Pseudocode B
//static member metadata could be accessed only using class
Field instanceMemberMetadata = memberof(Person.totalPersons);
//instance member metadata could be accessed also using object instance
Person myFriend = new Person("Oscar");
Field instanceMemberMetadata = memberof(myFriend.fullName);
```

FIG. 9

```
//accessing member when having source object
var somebody = new Person("Anonymous");
MemberInfo memberMetadata = memberof(somebody.FullName); //or any other member //accessing field without having source object
FieldInfo fieldMetadata = memberof(Person.FullName);

//accessing property without having source object
PropertyInfo propertyMetadata = memberof(CustomerViewModel.FullName);

//accessing parameter less constructor metadata
ConstructorInfo constructorMetadata = memberof(CustomerViewModel());

//accessing metadata from constructor with one string parameter
ConstructorInfo constructorMetadata = memberof(Person(string));

//accessing parameter less method metadata without having source object
MethodInfo methodMetadata = memberof(Person.DoSomething());

//accessing metadata from method with two parameters: string and double
MethodInfo methodMetadata = memberof(Person.DoSomething(string, double));

//accessing metadata from event
EventInfo eventMetadata = memberof(Person.SomeEvent);
```

FIG. 10

```
Person somebody = new Person("Anonymous");
//AccessibleObject - superclass for Constructor, Method, Field AccessibleObject
memberMetadata = memberof(somebody.fullName);

Field fieldMetadata = memberof(Person.fullName);

Constructor<CustomerViewModel> constructorMetadata = memberof(CustomerViewModel());

Constructor<Person> constructorMetadata = memberof(Person(String.class));

Method methodMetadata = memberof(Person.doSomething());

Method methodMetadata = memberof(Person.doSomething(String.class, double.class));
```

FIG. 11

```
//base class is simple class without generic parameter
public class CustomerViewModel : ViewModelBase
{
    private readonly Customer _model;
    public CustomerViewModel(Customer model)
    {
        _model = model;
    }
    public string FullName
    {
        get { return _model.FullName; }
        set
        {
            if (_model.FullName != value)
            {
                _model.FullName = value;
                //optimal type safety, but member access code
                //doesn't use available context information
                MemberInfo info = memberof(this.FullName);
                OnPropertyChanged(info.Name);
            }
        }
    }
}
```

FIG 12

```
//base class is simple class without generic parameter
public class CustomerViewModel : ViewModelBase
{
    private readonly Customer _model;
    public CustomerViewModel(Customer model)
    {
        _model = model;
    }
    public string CustomerName
    {
        get { return _model.FullName; }
        set
        {
            if (_model.FullName != value)
            {
                _model.FullName = value;
                //optimal type safety, context dependent member metadata access
                //clean code
                MemberInfo info = member; //returns PropertyInfo instance
                OnPropertyChanged(info.Name);
            }
        }
    }
}
```

FIG. 13 -Prior Art-

```
public IEnumerable<object> FilterByEquality (MemberInfo memberMetaData, object
constrainedValue) {…}
```

FIG. 14

```
//accessing member when having source object
var somebody = new Person("Anonymous");
MemberInfo<string> memberMetadata = memberof(somebody.FullName);

//accessing field without having source object
FieldInfo<string> fieldMetadata = memberof(Person.FullName);

//accessing property without having source object
PropertyInfo<string> propertyMetadata = memberof(CustomerViewModel.FullName);

//accessing parameter less constructor metadata
ConstructorInfo<Action> constructorMetadata = memberof(CustomerViewModel());

//accessing metadata from constructor with one string parameter
ConstructorInfo<Action<String>> constructorMetadata = memberof(Person(string));

//accessing parameterless method metadata without having source object
MethodInfo<Action> methodMetadata = memberof(Person.DoSomething());

//accessing metadata from method with one parameter of type string
MethodInfo<Action<string>> methodMetadata
    = memberof(Person.DoSomething(string));

/*accessing metadata from method with two parameters: first - string, second - double and
returning value of type - int */
MethodInfo<Func<string, double, int>> methodMetadata
    = memberof(Person.DoSomething(string, double));

//accessing metadata from event
EventInfo<EventArgs> eventMetadata = memberof(Person.SomeEvent);
```

FIG. 15

```
Person somebody = new Person("Anonymous");
//AccessibleObject - superclass for Constructor, Method, Field AccessibleObject<String>
memberMetadata = memberof(somebody.fullName);

//accessing field without having source object
Field<String> fieldMetadata = memberof(Person.fullName);

//accessing parameter less constructor metadata
Constructor<CustomerViewModel, Action> constructorMetadata =
memberof(CustomerViewModel());

//accessing metadata from constructor with one string parameter
Constructor<Person, Action1<String>> constructorMetadata =
memberof(Person(String.class));

//accessing parameterless method metadata without having source object
Method<Action> methodMetadata = memberof(Person.doSomething());

//accessing metadata from method with one parameter of type string
Method<Action1<string>> methodMetadata = memberof(Person.doSomething(String));

/*accessing metadata from method with two parameters: first - string, second - double and
returning value of type - int */
Method<Func2<String, double, int> methodMetadata =
memberof(Person.doSomething(String.class, double.class));
```

FIG. 16

```
//method FilterByEquality declaration
public IEnumerable<object> FilterByEquality <T>(MemberInfo<T> memberMetaData, T
constrainedValue) {...}

//method FilterByEquality usage example
string personName = "John Doe";
var memberMetadata = memberof(Person.FullName);
IEnumerable<object> wantedPersons = FilterByEquality(memberMetadata, personName);
```

FIG. 17

```
//accessing member when having source object
var somebody = new Person("Anonymous");
MemberInfo<Person, string> memberMetadata = memberof(somebody.FullName);

//accessing field without having source object
FieldInfo<Person, string> fieldMetadata = memberof(Person.FullName);

//accessing property without having source object
PropertyInfo<CustomerViewModel, string> propertyMetadata
    = memberof(CustomerViewModel.FullName);

//accessing parameter less constructor metadata
ConstructorInfo<CustomerViewModel, Action> constructorMetadata
    = memberof(CustomerViewModel());

//accessing metadata from constructor with one string parameter
ConstructorInfo<Person, Action<String>> constructorMetadata
    = memberof(Person(string));

//accessing parameter less method metadata without having source object
MethodInfo<Person, Action> methodMetadata = memberof(Person.DoSomething());

//accessing metadata from method with one parameter of type string
MethodInfo<Person, Action<string>> methodMetadata
    = memberof(Person.DoSomething(string));

/*accessing metadata from method with two parameters: first - string, second - double and
returning value of type - int */
MethodInfo<Person, Func<string, double, int>> methodMetadata
    = memberof(Person.DoSomething(string, double));

//accessing metadata from event
EventInfo<Person, EventArgs> eventMetadata = memberof(Person.SomeEvent);
```

FIG. 18

```
//Pseudocode B
Person somebody = new Person("Anonymous");
//AccessibleObject - superclass for Constructor, Method, Field AccessibleObject<Person,
String> memberMetadata = memberof(somebody.fullName);

//accessing field without having source object
Field<Person, String> fieldMetadata = memberof(Person.fullName);

//accessing parameterless constructor metadata
Constructor<CustomerViewModel, Action> constructorMetadata =
memberof(CustomerViewModel());

//accessing metadata from constructor with one string parameter
Constructor<Person, Action1<String>> constructorMetadata =
memberof(Person(String.class));

//accessing parameterless method metadata without having source object
Method<Person, Action> methodMetadata = memberof(Person.doSomething());

//accessing metadata from method with one parameter of type string
Method<Person, Action1<string>> methodMetadata = memberof(Person.doSomething(String));

/*accessing metadata from method with two parameters: first - string, second - double and
returning value of type - int */
Method<Person, Func2<String, double, int> methodMetadata =
memberof(Person.doSomething(String.class, double.class));
```

FIG. 19

```
//method declaration example
public IEnumerable<TObject> FilterByEquality<TObject, TMember>(
    MemberInfo<TObject, TMember> memberMetaData, TMember constrainedValue) {...}

//usage example
string personName = "John Doe";
MemberInfo<Person, string> memberMetadata = memberof(Person.FullName);
IEnumerable<Person> wantedPersons = FilterByEquality(memberMetadata, personName);
```

FIG. 20 -Prior Art-

```
class Person
{
    public Address HomeAddress;
}
class Address
{
    public string Street;
}
```

FIG. 21

```
var instance = new Person();
instance.HomeAddress = new Address();
instance.HomeAddress.Street = "My street number 6";
var memberMetadata = memberof(instance.HomeAddress.Street);
```

FIG. 22

```
MemberInfo<Person, string> memberMetadata =
memberof(instance.HomeAddress.Street);
```

FIG. 23

```
var homeAddress = instance.HomeAddress;
MemberInfo<Address, string> memberMetadata = memberof(homeAddress.Street);
```

FIG. 24

```
//method declaration
void TestMetadata<T, TProp>(MemberInfo<T, TProp> memberAccessExpression) {…}

//method call
TestMetadata(memberof(Person.FullName));
```

FIG. 25

```
//method call
TestMetadata(meta Person.FullName);
```

FIG. 26

```
//TestMetadata1 method declaration
void TestMetadata1<T, TField>(FieldInfo<T, TField> memberAccessExpr) {…}

//TestMetadata1 method call providing field from class Person
TestMetadata1(meta Person.FullName);
```

FIG. 27

```
//TestMetadata2 method declaration
void TestMetadata2<T, TProp>(PropertyInfo<T, TProp> memberAccessExpr) {…}

//TestMetadata2 method call providing property from class CustomerViewModel
TestMetadata3 (meta CustomerViewModel.FullName);
```

FIG. 28

```
//TestMetadata3 method declaration
void TestMetadata3<T, TMet>(MethodInfo<T, TMet> memberAccessExpr) {…}

//TestMetadata3 method call providing other method from class Person
TestMetadata3 (meta Person.DoSomething(string, double));
```

FIG. 29

```
//TestMetadata4 method declaration
void TestMetadata4<T, TCon>(ConstructorInfo<T, TCon> memberAccessExpr) {…}

//TestMetadata4 method call providing constructor of class Person
TestMetadata4 (meta Person(string));
```

FIG. 30

```
//TestMetadata5 method declaration
void TestMetadata5<T, TEventArgs>(EventInfo<T, TEventArgs> memberAccessExpr) {…}

//TestMetadata5 method call providing event declared in class Person
TestMetadata5 (meta Person.SomeEvent);
```

FIG. 31 -Prior Art-

```
@using (Html.BeginForm())
{
    <p>Your name: @Html.TextBox("FullName")</p>
    <input type="submit" value="Go" />
}
```

FIG. 32 -Prior Art-

```
@model LrcSite.Models.Person

@using (Html.BeginForm())
{
    <p>Your name: @Html.TextBoxFor(model => model.FullName)</p>
    <input type="submit" value="Go" />
}
```

FIG. 33

```
public static MvcHtmlString TextBoxFor<T, TProp>(this HtmlHelper<T> html,
    MemberInfo<T, TProp> memberAccess)
{
    var tag = new TagBuilder("input");
    tag.MergeAttribute("name", memberAccess.Name);
    tag.MergeAttribute("type", "text");

ModelState modelState;
    html.ViewData.ModelState.TryGetValue(memberAccess.Name, out modelState);
    var value = modelState != null && modelState.Value != null
        ? modelState.Value.ConvertTo(typeof(TProp)) : default(TProp);

tag.MergeAttribute("value", Convert.ToString(value));
    return MvcHtmlString.Create(tag.ToString());
}
```

FIG. 34

```
@model LrcSite.Models.Person
@using (Html.BeginForm())
{
    <p>Your name: @Html.TextBoxFor(meta Person.FullName)</p>
    <input type="submit" value="Go" />
}
```

FIG. 35

```
//declaration of variable Html
public HtmlHelper<Person> Html;
…
//HTML helper TextBoxFor usage with method parameter modifier 'meta'
Html.TextBoxFor(meta Person.FullName);
```

FIG. 36

```
Html.TextBoxFor<Person, string>(meta Person.FullName);
```

FIG. 37

```
@model LrcSite.Models.Person

@using (Html.BeginForm())
{
    <p>Your name: @Html.TextBoxFor(meta FullName)</p>
    <input type="submit" value="Go" />
}
```

FIG. 38

```
//method declaration
void DoSomething(Type someTypeFormalParameter) {...}
//method call
DoSomething(meta Person);
```

FIG. 39 -Prior Art-

```
//method declaration
void DoSomething(Type someTypeFormalParameter) {...}
//method call
DoSomething(typeof(Person));
```

STRONGLY TYPED METADATA ACCESS IN OBJECT ORIENTED PROGRAMMING LANGUAGES WITH REFLECTION SUPPORT

CROSS-REFERENCE TO RELATED APPLICATIONS

This application claims the benefit of U.S. Provisional Application No. 61/603,342, filed 26 Feb. 2012.

REFERENCES CITED

Other Sources

1. Francois-Nicola Demers, Jacques Malenfant.: Reflection in logic, functional and object-oriented programming: a Short Comparative Study. In: Proc. of the IJCAI'95 Workshop on Reflection and Metalevel Architectures and their Applications in AI, pp. 29-38. Montreal (1995).
2. C# Language Specification Version 5.0. Microsoft Corporation.
3. Jon Skeet.: C# in Depth Second Edition, Manning, Stamford (2011).
4. James Gosling, Bill Joy, Guy Steele, Gilad Bracha, Alex Buckley: Java Language and Virtual Machine Specifications. Oracle Corporation.
5. Ira R. Forman, Nate Forman.: Java Reflection in Action. Manning Publications, (2004).
6. Josh Smith: WPF Apps With The Model-View-ViewModel Design Pattern. Microsoft Developer Network, Microsoft Corporation.
7. How to implement MVVM (Model-View-ViewModel) in TDD (Test Driven Development). Developer code samples, Microsoft Developer Network, Microsoft Corporation.
8. Alexandra Rusina: Getting Information About Objects, Types, and Members with Expression Trees. Microsoft Developer Network Blogs, Microsoft Corporation.
9. Joseph Albahari, Ben Albahari.: C#5.0 in a Nutshell, 5th Edition, The Definitive Reference. O'Reilly Media, (2012).
10. Caller Information (C# and Visual Basic). Microsoft Developer Network, Microsoft Corporation.
11. Eric Lippert: In Foof We Trust: A Dialogue. Microsoft Developer Network Blogs, Microsoft Corporation.
12. Jeffrey Palermo, Jimmy Bogard, Eric Hexter, Matthew Hinze, Jeremy Skinner.: ASP.NET MVC 4 in Action. Manning, N.Y. (2012).

BRIEF DESCRIPTION OF DRAWINGS

For invention disclosure purposes is used 'Pseudocode A' which is based on C# C programming language feature subset plus new invented features; and 'Pseudocode B' which is based on JAVA® programming language feature subset plus new invented features. The system and methods for providing type safe member metadata access in programming languages with reflection support are further described with reference to the accompanying drawings in which:

FIG. 1. show declaration of example class named Person in programming language C# and Pseudocode A. This example class is used in many C#- and Pseudocode A code examples to demonstrate use cases of various aspects of present invention.

FIG. 2. show reflection usage example in C#. Example demonstrates accessing instance and static member metadata for members declared in class Person shown in FIG. 1.

FIG. 3. show declaration of example class named Person in programming language JAVA® and Pseudocode B. This example class is used in many-JAVA® and Pseudocode B code examples to demonstrate use cases of various aspects of present invention.

FIG. 4. show reflection usage example in-JAVA®. Example demonstrates accessing instance and static member metadata for members declared in class Person shown in FIG. 3.

FIG. 5. show ViewModel declaration example in language C#. Method OnPropertyChanged event is fired by providing needed property name in compile time as string parameter.

FIG. 6. show ViewModel declaration example in language C#. Method OnPropertyChanged event is fired by providing expression tree data structure. Expression tree is processed at runtime taking significant amount of time.

FIG. 7. show ViewModel declaration example in language C#. Method OnPropertyChanged event is fired by providing needed property name in compile time. Compiler detects needed property name using CallerInfo attributes.

FIG. 8. show Pseudocode A and Pseudocode B examples demonstrating how operator memberof can be designed to return metadata from instance fields and how it is different from accessing only static fields.

FIG. 9. show Pseudocode A examples demonstrating use cases of operator memberof in accessing metadata of different kinds of members (according to class Person shown in FIG. 1.)

FIG. 10. show Pseudocode B examples demonstrating use cases of operator memberof in accessing metadata of different kinds of members (according to class Person shown in FIG. 3.)

FIG. 11. show ViewModel declaration example in language Pseudocode A. Method OnPropertyChanged event is fired by providing needed property name obtained from usage of operator memberof.

FIG. 12. show ViewModel declaration example in language Pseudocode A. Method OnPropertyChanged event is fired by providing needed property name obtained from usage of operator member.

FIG. 13. demonstrates Pseudocode A code for FilterByEquality method declaration where declared method accepts as parameter nongeneric version of metadata instance and some value.

FIG. 14. show Pseudocode A examples demonstrating use cases of operator memberof in accessing metadata of different kinds of members (according to class Person shown in FIG. 1.). Memberof operator returns generic version of metadata instance containing one generic parameter.

FIG. 15. show Pseudocode B examples demonstrating use cases of operator memberof in accessing metadata of different kinds of members (according to class Person shown in FIG. 3.). Memberof operator returns generic version of metadata instance containing one generic parameter.

FIG. 16. demonstrates Pseudocode A code for FilterByEquality method declaration where declared method accepts as parameter generic version of metadata instance and some value.

FIG. 17. show Pseudocode A examples demonstrating use cases of operator memberof in accessing metadata of different kinds of members (according to class Person shown in FIG. 1.). Memberof operator returns generic version of metadata instance containing 2 generic parameters.

FIG. 18. show Pseudocode B examples demonstrating use cases of operator memberof in accessing metadata of different kinds of members (according to class Person shown in FIG. 3.). Memberof operator returns generic version of metadata instance containing 2 generic parameters.

FIG. 19. demonstrates Pseudocode A code for FilterByEquality method declaration where declared method accepts as parameter generic version of metadata instance with 2 generic parameters and some value.

FIG. 20. demonstrates simplified class Person and class Address declaration in language Pseudocode A.

FIG. 21. demonstrates Pseudocode A code fragment where to operator memberof is passed multiple member access expression.

FIG. 22. demonstrates Pseudocode A code fragment where to operator memberof is passed multiple member access expression and type of returning value is specified explicitly.

FIG. 23. demonstrates another Pseudocode A code fragment where to operator memberof is passed single member access expression.

FIG. 24. show declaration of method TestMetadata in Pseudocode A and metadata passing to this method using operator memberof.

FIG. 25. show metadata passing to method TestMetadata using method parameter access modifier 'meta'.

FIG. 26. show field metadata passing to method using method parameter access modifier 'meta'.

FIG. 27. show property metadata passing to method using method parameter access modifier 'meta'.

FIG. 28. show method metadata passing to method using method parameter access modifier 'meta'.

FIG. 29. show constructor metadata passing to method using method parameter access modifier 'meta'.

FIG. 30. show event metadata passing to method using method parameter access modifier 'meta'.

FIG. 31. show view designed in ASP.NET MVC Razor View Engine where HTML helper 'TextBox' is used in type unsafe way (executable code represented in programming language C#).

FIG. 32. shown view designed in ASP.NET MVC Razor View Engine where HTML helper 'TextBox' is used together with expression trees.

FIG. 33. show how using Pseudocode A can be improved HTML helper 'TextBox' implementation example for ASP-.NET MVC Razor View Engine. HTML helper uses metadata instance where type of metadata instance consists of 2 generic parameters.

FIG. 34. show how using Pseudocode A can be improved view designed in ASP.NET MVC Razor View Engine where HTML helper 'TextBox' (shown in FIG. 33) is used together with method parameter access modifier 'meta'.

FIG. 35. Show how ASP.NET MVC Razor View Engine view can be improved using Pseudocode A code example in which is used HTML helper 'TextBox' (shown in FIG. 33) using method parameter access modifier 'meta'.

FIG. 36. show how ASP.NET MVC Razor View Engine view can be improved using Pseudocode A code example in which is used HTML helper 'TextBox' (shown in FIG. 33) using method parameter access modifier 'meta' and specifying HTML helper generic parameters explicitly.

FIG. 37. show how using Pseudocode A can be improved view designed in ASP.NET MVC Razor View Engine where HTML helper 'TextBox' (shown in FIG. 33) is used together with method parameter access modifier 'meta'. View is strongly typed and in HTML helper call is employed all context information available.

FIG. 38. show method parameter modifier 'meta' used with types in Pseudocode A.

FIG. 39. show standard C# operator 'typeof' usage example.

BACKGROUND

Reflection is a powerful mechanism provided by some major object oriented languages and frameworks that allows to access information about classes and their members at metadata level, and use it in different scenarios. Some of few use cases are: detecting what kind of methods or fields does the class have, detecting the specific field data type at runtime, dynamically invoking method which name is unknown at compile time. These are non-standard cases of classical object oriented programming, but they make a great significance in contemporary object oriented design solutions and frameworks where modularity and extensibility are key values (1).

Reflection is designed the way that metadata access is not straightforward and type-safe for distinct members. The usual scenarios of using reflection allow:

traversing class fields or members, and doing the processing operations on each iteration;

checking if a specific member (field, method, constructor, event, property . . . ) with a specified name (and possible additional signature information for the latter) exists, and then processing it.

This approach does not allow direct and type-safe access of distinct fields or methods which programmer is aware of (2), (3), (4), (5).

FIG. 1 demonstrates C# example class named 'Person' declaration which has instance level field named 'FullName' and static field 'TotalPersons'. FIG. 2 demonstrated: getting metadata information about these fields.

FIG. 3 and FIG. 4 demonstrate same example in programming language JAVA®. JAVA® also allows accessing both private and public fields. In case of JAVA® there's a special case of retrieving class metadata by using "class" keyword as a member of class. Please note that JAVA® has some differences in metadata retrieval and metadata structure (e.g., Constructor has a single generic parameter referencing to a constructor holder class), but conceptual approach is almost identical to that of C#.

Previously demonstrated examples show existing technique of accessing metadata in two major general purpose programming languages: C# and JAVA®. Providing type member name as string instances to access type member metadata are not type safe. It means that code is not reliable for maintenance (refactoring) and also if there is a mistake it will be noticed only at runtime.

The most obvious benefit of static type-checking is that it allows early detection of some programming errors. Errors that are detected early can be fixed immediately, rather than lurking in the code to be discovered much later, when the programmer is in the middle of something else or even after the program has been deployed. Most of general purpose object-oriented programming languages are strongly typed, but none of them provide fully type safe metadata access mechanism—they lack type safe type (class/structure) member metadata access. Not all programming languages support metadata access mechanisms like reflection, but for languages which support metadata access, type safety in this field is considered to be a property of a computer program rather than the language in which that program is written. In such cases programmer is responsible for type safety which means correct metadata representation in basic data types, usually strings.

FIG. 5 demonstrates member metadata access use case in MVVM design pattern usage (6). Best that programmer can do if programming language does not have strongly typed type member metadata access is checking type member names (metadata) at runtime which only partly solves type safety issues, but on downside makes code more complex, forces programmer to use redundant type expressions and leads to performance slowdown. Microsoft® provides best practices to access metadata in mentioned type safe way using lambda expressions (7), (8). Metadata access example using lambda expressions are shown in FIG. 6. Unfortunately described practices do not guarantee 100% type safety and desired result. In case if programmer provides lambda expression which does not contain member access expression, program execution will fail.

In C#5, it is possible to tag optional parameters with one of three caller info attributes (9), (10): [CallerMemberName] applies the caller's member name; [CallerFilePath] applies the path to caller's source code file; [CallerLineNumber] applies the line number in caller's source code file. By using CallerInfo attributes, it is possible to obtain information about the caller to a method. You can obtain file path of the source code, the line number in the source code, and the member name of the caller. CallerInfo attributes instruct the compiler to feed information obtained from the caller's source code into the parameter's default value: This information is helpful for tracing, debugging, and creating diagnostic tools. FIG. 7 demonstrates modified C# example shown in FIG. 5 by using CallerInfo attributes. CallerInfo attributes make metadata access more type safe, metadata access is performed at compile time and it works much faster than processing expression trees at runtime. However, CallerInfo attributes are not a generic solution. Attributes (annotations in Java) are metadata by definition and type safe metadata access using nothing else than another metadata is odd and can't be ideal solution. CallerInfo attributes are suitable for narrow use cases: to safely access member name from inside the member (property or method, but not field), but are not applicable for data querying, because data are contained in fields.

All mentioned downsides can be solved by introducing language improvements to support type safe metadata access which would make compile-time checks possible. For invention disclosure purposes is used 'Pseudocode A' which is based on C# programming language feature subset plus new invented features; and 'Pseudocode B' which is based on JAVA® programming language feature subset plus new invented features. Type metadata gathering operator "typeof" (Pseudocode A) and ".class" call (Pseudocode B) returns metadata about specified type (class, structure, interface), but there is no type safe way to access class member metadata. For example, programming languages can be extended with operator named 'memberof' so that memberof(classField) returns field metadata instance FieldInfo (Pseudocode A) or Field (Pseudocode B) instances instead of field value instances. Microsoft® has been working on design of type safe member metadata access operator named "infoof" (11). The following example shows how non-static field from previous example can be accessed without using instance reference of class:

//Pseudocode A:
  FieldInfo instanceMemberMetadata=infoof(Person.FullName);
Alternatively Pseudocode B example would be as follows:
//Pseudocode B:
  Field instanceMemberMetadata=infoof(Person.fullName);

Field 'FullName' is used like static field, but since type cannot have instance level member and static level member with the same name, there should be no misunderstanding to which field we are pointing to and system should return correct metadata instance. The same is with methods, properties, events and constructors. Microsoft®. has been thinking about operator infoof as similar operator to operator typeof which allows type safe metadata access:
  Type info=typeof (int);
Operator typeof accepts parameter which is type instead of instance. Following example is invalid according to C# specification:
  Type x=typeof(6);
Use cases of member metadata access operator, that does not accept instance expressions as operator parameter, are too specific and that is not enough for fully type safe member metadata access.

SUMMARY

Current invention provides methods for type safe type (class/structure) member metadata access in programming languages with support reflection. Type member metadata access invention is based on introduction of different forms (including generic forms) of operator 'memberof', context dependent operator 'member' and method parameter modifier 'meta' which forces compiler to interpret method actual parameter (argument which is instance member expression) as metadata access expression instead of value access expression. Introduced operators require changes in programming frameworks like .NET, JAVA® and others, as well as propose improvements in syntax of general purpose programming languages, but as result make programming languages fully type safe in metadata access field.

DETAILED DESCRIPTION

The disclosed invention facilitates extending object oriented programming languages with new operators to support type safe type (class/structure) member metadata access.

Member metadata access operator can be designed to work also with member instance expressions as demonstrates FIG. 8. The most important aspect of operator memberof is that member access or member call expressions provided to operator memberof are not processed as member access operations/member call operations, but instead the metadata instance of supplied member (field, method, property, constructor, event) is created and returned. This means that code from previous example—memberof(myFriend.FullName)—is not reducible to memberof("Oscar") as it would be if field myFrield.FullName would be interpreted as field access operation.

Operator 'memberof' could be overloaded with following versions: Pseudocode A:
  1) memberof(field) which should return FieldInfo instance;
  2) memberof(method(parameter type list—optional)) which should return MethodInfo instance;
  3) memberof(property) which should return PropertyInfo instance;
  4) memberof(class(parameter type list—optional)) which should return ConstructorInfo instance;
  5) memberof(event) which should return EventInfo instance;
In Pseudocode A class MemberInfo is base class for classes: FieldInfo, MethodInfo, PropertyInfo, ConstructorInfo, EventInfo and in cases when is needed only type safe member name determination, better is to use MemberInfo instance. Similar metadata type system architecture is in programming language Pseudocode B, differs only metadata class names and usage syntax:

Pseudocode B:
1) memberof(field_path)—returns Field instance for a given field (expressed with a full path, e.g., myFriend.fullName or Person.fullName);
2) memberof(method_path(Class<?> . . . parameterTypes))—returns Method instance;
3) memberof(class_name(Class<?> . . . parameterType))—returns Constructor instance representing constructor information for the given class.

Pseudocode A examples using operator memberof are demonstrated in FIG. 9 and Pseudocode B examples are demonstrated in FIG. 10. In order to maintain Pseudocode B consistency with existing JAVA® language specification, meta-data class Constructor provides a single generic parameter which references to a parent class of a constructor (just as described in examples above when metadata was retrieved using standard solution).

One of most valuable use cases of operator 'memberof' could be in design pattern MVVM ViewModel declarations. FIG. 11 shows more type safe version of class CustomerViewModel than was introduced in Background section (type safety is achieved by using operator 'memberof').

Many programming languages have operator 'this' which points to current instance context, but none of programming languages have operator which could point to current instance member context. Such operator could be operator named 'member' as shown in FIG. 12. Operator 'member' depends on usage context. When used in constructor code block it should return constructor metadata instance, when used in method code block it should return method metadata instance, when used in property code blocks it should return property metadata instance. The difference from non-generic operator memberof usage example is that now we are using context dependent operator which will be handled by compiler. Context dependent operator enables easier code refactoring, for example, in renaming property, changes inside property declaration (including body) are required to be made only in one place—in property name.

Sometimes it's required not only to access type member metadata, but also to process type member taking into consideration some parameter(s) whose type should be compatible with initial member type. For example, in database querying useful could be method 'FilterByEquality' declared as shown in FIG. 13. Demonstrated example is not type safe because type of parameter 'constrainedValue' may not be compatible with type of member to which parameter 'memberMetaData' indirectly points to. To solve such problems we propose extending metadata types to generic versions:

//Pseudocode A:
1) MemberInfo<T> should replace MemberInfo;
2) FieldInfo<T> should replace FieldInfo;
3) MethodInfo<T> should replace MethodInfo;
4) PropertyInfo<T> should replace PropertyInfo;
5) ConstructorInfo<T> should replace ConstructorInfo;
6) EventInfo<T> should replace EventInfo.

//Pseudocode B:
1) AccessibleObject<T> should replace AccessibleObject;
2) Field<T> should replace Field;
3) Method<T> should replace Method;
4) Constructor<C, T> should replace Constructor<C>.

Note that Java® based Pseudocode B metadata class Constructor already had a single type-parameter (referencing to a constructor's holder class), and thus we are extending it by an additional generics parameter.

Now operator 'memberof' should return generic versions of metadata instances.

Pseudocode A:
1) memberof(suppliedField) which should return FieldInfo<T> instance and T is type of field 'suppliedField';
2) memberof(suppliedMethod(parameter type list—optional)) which should return MethodInfo<T> instance and type T is type container for all 'suppliedMethod' parameters. In C# based pseudocode A this type container could be standard delegate: Func< . . . > or Action< . . . >. Which type exactly will function as type container depends on 'suppliedMethod' returning type—for methods with returning value type container will be Func< . . . > and for methods without returning value (void) type container will be Action< . . . >. It is possible to use custom type container types, but better is to stick to well-known standard classes, this way it would be possible to use implicit type declarations (keyword 'var');
3) memberof(suppliedProperty) which should return PropertyInfo<T> instance and T is type of property 'suppliedProperty';
4) memberof(suppliedClass(parameter type list—optional)) which should return ConstructorInfo<T> instance and type T is type container for all 'suppliedClass' constructor parameters. In Pseudocode A this type container could be standard delegate Action< . . . >;
5) memberof(event) which should return EventInfo<T> instance where type T should specify event argument (in should be class EventArgs or class which inherits from EventArgs);

Similarly improved operator 'memberof' can be designed for Java® based Pseudocode B and other programming languages. Usage examples of improved operator 'memberof' are demonstrated in FIG. 14 (Pseudocode A examples) and FIG. 15 (Pseudocode B examples). In programming languages which does not support delegates, programmer needs to take care of designing type containers for method parameters. Type 'Action' variations are supposed to function as method parameter type containers for methods which do not have returning value (void methods). Type 'Action' is supposed to describe fact that method does not have parameters; Action1<T1> is supposed to describe fact that method has one parameter with type should equal to generic parameter T1; Action2<T1, T2> is supposed to describe fact that method has two parameters which types should be equal to generic parameters T1 and T2 accordingly; and so on . . . . Similarly is with 'Func' variations. 'Func' acts as method parameter type container for methods which return value. Func<R> is supposed to describe fact that method does not have parameters and type of returning value should be equal to generic parameter R. Func1<T1, R> is supposed to describe fact that method has one parameter of type which should be equal to generic parameter T1 and type of returning value should be equal to generic parameter R. Func2<T1, T2, R> is supposed to describe fact that method has two parameters of types which should be equal to generic parameters T1 and T2 accordingly and type of returning value should be equal to generic parameter R. Please note that the final names of 'Action' and 'Func' type containers can be changed depending on a target framework.

E.g., C# based Pseudocode A already provides such types along with delegates, and it allows using the same name across different versions (different generic parameters' count designates different types). However, in case of Java® based Pseudocode B generics are processed differently, and different type names required even if generics declaration differs. The Action, Action1, Action2, . . . and Func, Func1, Func2, . . . could be introduced in Pseudocode B as a metadata parameter holders. Taking into consideration all previously proposed ideas, method 'FilterByEquality' example can be improved as shown in FIG. 16. Important part is in expression: memberof(Person.FullName) which returns FieldInfo<T> instance where type T is determined as string. Compiler automatically detects type of variable 'memberMetadata' from 'memberof' operator call context and in example this type is MemberInfo<string>. Demonstrated example of 'memberof' call is equivalent to following code where returning type is explicitly declared:

MemberInfo<string> memberMetadata=memberof(Person.FullName);

Method's 'FilterByEquality' example still are not fully type safe, because returning collection items type is not detected from provided metadata. Problem can be solved by extending metadata containing types with one more generic parameter which will hold member containing object's type information.

This means: MemberInfo<T> extension to MemberInfo<TObject, TMember> where TMember refers to member's type and TObject refers to members containing object type:

//Pseudocode A:
1) MemberInfo<TObject, TMember> should replace MemberInfo;
2) FieldInfo<TObject, TMember> should replace FieldInfo;
3) MethodInfo<TObject, TMember> should replace MethodInfo;
4) PropertyInfo<TObject, TMember> should replace PropertyInfo;
5) ConstructorInfo<TObject, TMember> should replace ConstructorInfo;
6) EventInfo<TObject, TMember> should replace EventInfo.

//Pseudocode B:
1) Member<TObject, TMember> should replace Member;
2) Field<TObject, TMember> should replace Field;
3) Method<TObject, TMember> should replace Method;
4) Constructor<TObject, TMember> should replace Constructor.

Improved operator 'memberof' usage examples for Pseudocode A are demonstrated in FIG. 17 and Pseudocode B examples in FIG. 18. Taking into consideration previously described improvements to operator 'memberof', example with method 'FilterByEquality' can be declared as shown in FIG. 19. Last code line from example demonstrated in FIG. 19 can be rewritten to use implicit type declaration as follows:

var wantedPersons=FilterByEquality(memberMetadata, personName);

It is possible that member access expression is invoked from existing member access expression. Consider example class declarations shown in FIG. 20. Example of multiple level member access expression with two level member accesses expression is shown in FIG. 21.

In case of two level member access expression (in example: instance.HomeAddress. Street) type of operator 'memberof' returning value should be member containing type from first member access expression. In example, first member access expression is 'HomeAddress' member access expression and its containing type is Person, so previous example can be rewritten without implicit type declaration as shown in FIG. 22. Interesting part is what should be exact type of variable 'memberMetadata'?

For multiple member access expressions to be useful as metadata, compiler should maintain whole chain of member access expressions. In previous example it means that variable 'memberMetadata' represents 'Street' member access expression and contains information that member 'Street' was accessed from 'HomeAddress' which is another member access expression. Member 'HomeAddress' was accessed from instance (not from another member access expressions), so here stops member access chain backtracking.

If is needed Address as returning type and we have only 'Person' instance, then multiple member access expression should be separated as shown in FIG. 23.

Such multiple member access level behaviour of 'memberof' operator would be useful in defining queries.

Metadata can be gathered and then passed to methods, like in example shown in FIG. 24. In cases when metadata needs to be passed to method as parameter, operator 'memberof' syntax can be transformed into much nicer syntax using method parameter modifier called 'meta' as shown in FIG. 25. Method parameter modifier 'meta' forces compiler to interpret method actual parameter as metadata access expression instead of value access expression what is default behaviour in method parameter interpretation. Reference parameters and output parameters changes not only how method accepts parameter, but also the way how method processes parameters, that is why reference parameters and output parameters requires parameter modifier usage at method declaration. Method parameter modifier 'meta' makes changes only in actual value passed to method call. Parameter modifier 'meta' does not impact method execution, so method parameter modifier 'meta' specifying at method declaration is not necessary.

Method parameter modifier 'meta' has 5 different forms:
Example of parameter modifier for field metadata access is shown in FIG. 26.
Example of parameter modifier for property metadata access is shown in FIG. 27.
Example of parameter modifier for method metadata access is shown in FIG. 28.
Example of parameter modifier for constructor metadata access is shown in FIG. 29.
Example of parameter modifier for event metadata access is shown in FIG. 30.

Most benefits from method parameter modifier 'meta' usage can be gained in frameworks where reflection is used as architectural discipline, especially in frameworks supporting MVC architectural pattern where views usually are linked with models using binding mechanism which uses reflection. In FIG. 31 shown example demonstrates View designed in ASP.NET MVC Razor View Engine (12). HTML helper 'TextBox' accepts metadata in type unsafe way.

Best that is possible without operator 'memberof' invention is usage of lambda expressions as shown in FIG. 32. Example view is defined as strongly typed, this means, that variable 'Html' is of type HtmlHelper<Person> and that is why HTML helper 'TextBoxFor' can accept member 'Person.FullName' metadata in strongly typed way. But, as lambda expressions are processed at runtime, they are not fully type safe. Besides lambda expressions syntax in HTML helper case requires declaration of formal parameter (in previous example it is parameter named 'model') which is unnecessary from syntax perspective and should be removed to simplify syntax.

FIG. 33 demonstrates simple HTML helper 'TextBoxFor' accepting member metadata instance. Example demonstrates how metadata from 'memberAccess' expression is gathered during compile time and syntax does not contain any unnecessary or redundant parts. Improved HTML helper calling code is demonstrated in FIG. 34 where is defined ASP.NET MVC Razor example view using method parameter modifier 'meta'. But still example can be simplified! In case of strongly typed view, member containing type specification in member access expression is redundant. In FIG. 35 is shown simplified, but equivalent code sample to previously declared ASP.NET MVC Razor view example. Still HTML helper usage example can be rewritten specifying generic parameters explicitly as shown in FIG. 36. Now can be seen, that generic parameter 'T' (type 'Person') in HTML helper 'TextBoxFor' call is used in 3 places: in 'Html' variable declaration, in 'TextBoxFor' method call and in member access expression. Compiler uses type inference to detect unknown generic types and for compiler it is sufficient to supply type for generic parameter only in one place instead of all tree places. In example, place where generic parameter T type is specified is in variable 'Html' declaration, so further generic parameter T specifications are not necessary. In similar way compiler is capable to infer type of generic parameter 'TProp' from member access expression 'Person.FullName', so the shortest syntax of HTML helper 'TextBoxFor' usage would be as follows: Html.TextBoxFor(meta FullName);

Finally, type member metadata access and usage syntax in all aspects are short, expressive and fully type safe. In FIG. 37 is demonstrated example of shortest syntax form for method modifier 'meta' demonstrating how metadata should be provided to HTML helpers in ASP.NET MVC Razor views engine.

The only part that is not yet covered is method parameter modifier 'meta' for types (member containers). If method parameter modifier 'meta' works with type members, it should work with types as well. FIG. 38 example demonstrates method parameter 'meta' usage syntax with types. Such practice is equivalent to code usage pattern shown in FIG. 39. In case of method modifier 'meta' syntax is much simpler and nicer.

What is claimed is:

1. A method executed by a processor for a type safe type member, of a class, metadata access in statically typed general purpose programming languages (hereafter referred to as programming languages) which support reflection where the method comprising:
    invoking, in a source code of a programming language of the programming languages, a new programming method that is not part of the programming languages, through the usage of overloading of an operator of the programming language, such as 'memberof', and an input; where the invoked new programming method:
        receives, as the input, a member access express or a member invocation expression (hereafter both referred to as a member expression) of the member;
        retrieves, member metadata of the member, using the input member expression without having ownership of an instantiated instance of the class of the member and without performing the corresponding member access or the corresponding member invocation operation of the member expression; wherein the member metadata comprising: name of the member and type of the member;
        creates a generic version of a metadata instance of the retrieved member metadata, where the generic version of the metadata instance contains, in addition to the retrieved member metadata, a generic parameter, which is a generic type that can be used in type checking at compile time to improve type safety;
        sets the generic parameter of the generic version of the metadata to be type of the member used in the member expression; and
        outputs the generic version of the metadata instance as a result;
    processing the result of the new programming method by a compiler during a compilation of the source code, to perform the type checking at compile time to improve type safety of the source code; and
    creating the generic version of the metadata instance as the result of the new programming method at runtime during the execution of the new programming method.

2. The method of claim 1 wherein the new programming method is applied to a field of the class and the result of the new programming method is the generic version of the metadata instance comprising: metadata of the field; and generic parameter which is set to be type of the field.

3. The method of claim 1 wherein the new programming method is applied to a property of the class and the result of the new programming method is the generic version of the metadata instance comprising:
    metadata of the property; and
    the generic parameter which is set to be type of the property.

4. The method of claim 1 wherein the new programming method is applied to a programming language method of the class and the result of the new programming method is the generic version of the metadata instance comprising:
    metadata of the programming language method; and
    the generic parameter which contain type parameters matching types of input parameters and return value of the programming language method.

5. The method of claim 1 wherein the new programming method is applied to a constructor of the class and the result of the new programming method is the generic version of the metadata instance comprising:
    metadata of the constructor; and
    the generic parameter which contain type parameters matching types of input parameters of the constructor.

6. The method of claim 1 wherein the new programming method is applied to an event of the class and the result of the new programming method is the generic version of the metadata instance containing:
    metadata of the event; and
    the generic parameter which contain type parameter matching type of an argument of the event.

7. The method of claim 2 wherein the result of the overloaded operator 'memberof' invocation is metadata instance of a specified field, of the class, the result includes an additional generic parameter containing a type in which the specified field is declared and if the overloaded operator 'memberof' is applied to a several level member access expression, then the additional generic parameter is set to type of member of first level of the several level member access expression.

8. The method of claim 3 wherein the result of the overloaded operator 'memberof' invocation is metadata instance of a specified property, of the class, the result includes an additional generic parameter containing a type in which the specified property is declared and if the overloaded operator 'memberof' is applied to a several level member access expression, then the additional generic parameter is set to type of member of first level of the several level member access expression.

9. The method of claim 4 wherein the result of the overloaded operator 'memberof' invocation is metadata instance of a specified programming language method, of the class, the result includes an additional generic parameter containing a type in which the specified programming language method is declared and if the overloaded operator 'memberof' is applied to a several level member access expression, then the additional generic parameter is set to type of member of first level of the several level member access expression.

10. The method of claim 5 wherein the result of the overloaded operator 'memberof' invocation is metadata instance of a specified constructor, of the class, the result includes an additional generic parameter containing a type in which the specified constructor is declared and if the operator overloaded 'memberof' is applied to a several level member access expression, then the additional generic parameter is set to type of member of first level of the several level member access expression.

11. The method of claim 6 wherein the result of the overloaded operator 'memberof' invocation is metadata instance of an specified event, of the class, the result includes an additional generic parameter containing a type in which the specified event is declared and if the overloaded operator 'memberof' is applied to a several level member access expression, then the additional generic parameter is set to type of member of first level of the several level member access expression.

12. The method of claim 1, wherein the new programming method is used in a programming language method code block in the source code of the class, further comprising:
invoking, in the programming language method code block the new programming method, through the usage of an operator, that is not part of the programming languages, which can be named as 'member', where the invoked new programming method:
receives, automatically as the input, the class in which the new programming method is used, where the name of the class is not explicitly used as input to the new programming method;
outputs, as the result, the generic version of the metadata instance containing metadata of the class and the generic parameter containing, for each member, field, property, programming method, or event, of the class a corresponding type of the member, field, property, programming method, or event, of the class.

13. The method of claim 1 wherein the new programming method is used in a parameter list of an invocation of a programming language method in the source code, the method further comprising:
invoking, in the parameter list, the new programming method through the usage of a new parameter modifier, that is not part of the programming languages, which can be named as 'meta', and an input of the new parameter modifier, where the invoked new programming method:
receives, as the input, the member expression of the member;
outputs, as the result, the generic version of the metadata instance containing member metadata of the member; and the generic parameter which is a type of the member; wherein the type is automatically set to be type of the generic version of the metadata instance.

14. The method of claim 13 wherein the method parameter modifier 'meta' is applied to a field, of the class, access expression and the result of the method parameter modifier 'meta' is the generic version of the metadata instance containing: metadata of the field; and the generic parameter which is automatically set to be type of the field.

15. The method of claim 13 wherein the method parameter modifier 'meta' is applied to a property, of the class, access expression the result of the method parameter modifier 'meta' is the generic version of the metadata instance containing: metadata of the property; and the generic parameter which is automatically set to be type of the property.

16. The method of claim 13 wherein the method parameter modifier 'meta' is applied to a programming language method, of the class, access expression wherein the result of the method parameter modifier 'meta' is the generic version of the metadata instance containing: metadata of the programming language method; and the generic parameter is automatically set to contain type parameters matching types of corresponding input parameters and return value of the programming language method.

17. The method of claim 13 wherein the method parameter modifier 'meta' is applied to a constructor, of the class, access expression wherein the result of the method parameter modifier 'meta' is the generic version of the metadata instance containing metadata of properties of the class; and the generic parameter which is automatically set to contain type parameters matching types of corresponding input parameters of the constructor.

18. The method of claim 13 wherein the method parameter modifier 'meta' is applied to an event, of the class, access expression wherein the result of the method is the generic version of the metadata instance containing: metadata of the event; and the generic parameter which is automatically set to contain type parameter matching type of an argument of the event.

19. The method of claim 14 wherein the result contains an additional generic parameter automatically set to type of the class containing the field.

20. The method of claim 15 wherein the result contains an additional generic parameter automatically set to type of the class containing the property.

21. The method of claim 16 wherein the result contains an additional generic parameter automatically set to type of the class containing the programming language method.

22. The method of claim 17 wherein the result contains an additional generic parameter automatically set to type of the class containing the constructor.

23. The method of claim 18 wherein the result contains an additional generic parameter automatically set to type of the class containing the event.

* * * * *